United States Patent [19]

Lagain

[11] Patent Number: 5,182,430
[45] Date of Patent: Jan. 26, 1993

[54] POWDER SUPPLY DEVICE FOR THE FORMATION OF COATINGS BY LASER BEAM TREATMENT

[75] Inventor: Georges L. Lagain, Combs la Ville, France

[73] Assignee: Societe National d'Etude et de Construction de Moteurs d'Aviation "S.N.E.C.M.A.", Paris, France

[21] Appl. No.: 774,782

[22] Filed: Oct. 10, 1991

[30] Foreign Application Priority Data

Oct. 10, 1990 [FR] France .................. 90 12479

[51] Int. Cl.⁵ .................................... B23K 26/00
[52] U.S. Cl. ........................ 219/121.63; 219/121.84; 427/556; 118/641; 222/146.1
[58] Field of Search ........... 219/121.63, 124.64, 219/121.81, 121.74, 121.84; 427/53.1; 118/641; 222/146.1

[56] References Cited

U.S. PATENT DOCUMENTS

| | | | |
|---|---|---|---|
| 4,200,669 | 4/1980 | Schaefer et al. | 219/121.6 X |
| 4,270,675 | 6/1981 | Wicks et al. | 222/196 |
| 4,300,474 | 11/1981 | Livsey | 219/121.63 X |
| 4,730,093 | 3/1988 | Mehta et al. | 219/121.63 |
| 4,743,733 | 5/1988 | Mehta et al. | 219/121.66 |
| 4,835,357 | 5/1989 | Schalk | 219/121.64 |
| 5,038,014 | 8/1991 | Pratt et al. | 219/121.64 |

FOREIGN PATENT DOCUMENTS

| | | |
|---|---|---|
| 0173654 | 3/1986 | European Pat. Off. |
| 0212938 | 3/1987 | European Pat. Off. |
| 0213498 | 3/1987 | European Pat. Off. |
| 0335503 | 10/1989 | European Pat. Off. |
| 2452528 | 10/1980 | France |
| 2605310 | 4/1988 | France |
| 2642690 | 8/1990 | France |
| 2184380 | 6/1987 | United Kingdom |

Primary Examiner—C. L. Albritton
Attorney, Agent, or Firm—Oblon, Spivak, McClelland, Maier & Neustadt

[57] ABSTRACT

A powder supply device for use in the formation of a coating by a laser beam treatment has its delivery pipe from the powder and carrier gas dispensing apparatus fitted with an expansion chamber into which the powder and gas enter via an inlet pipe carrying a powder diffuser. The expansion chamber has a conical part leading into an outlet pipe for carrying powder and gas to a discharge nozzle at a reduced rate determined by the rate of escape of gas from the expansion chamber via an exhaust pipe fitted with a flow regulator.

4 Claims, 2 Drawing Sheets

POWDER SUPPLY DEVICE FOR THE FORMATION OF COATINGS BY LASER BEAM TREATMENT

BACKGROUND OF THE INVENTION

1. Field of the invention

The invention relates to a powder supply device for use in the formation of coatings by laser beam treatment.

2. Summary of the Prior Art

Methods for forming coatings by supplying powder and causing it to melt using an energy beam, particularly a laser beam, have been widely developed. Examples of such methods are disclosed in FR-A-2 605 310; EP-A-0 212 938; EP-A-0 213 498 and GB-A-2 184 380.

The equipment used generally comprises a powder supply device which is similar in principle to the powder dispensers previously known and used in the formation of plasma flame spray coatings and operating using a carrier gas, generally a neutral gas such as argon, at a specific pressure and rate of flow as a vehicle for the powder. However, such methods have given rise to problems when applied to the formation of coatings using laser beams. In particular, the high speed of the powder particles entrained by the carrier gas gives rise to losses and wastage of powder, and the intersections of the laser beam and the material are disturbed by blowing problems.

Attempts to improve these earlier devices have been proposed. Thus, U.S. Pat. No. 4 270 675 describes a powder dispenser in which the evenness of flow is ensured by a rod connected to a vibrator. FR-A-2 452 528 provides a control device regulating the admission of the powder particles into a tube through which the carrier gas flows. U.S. Pat. No. 4 730 093 and U.S. Pat. No. 4 743 733 describe a device comprising a volumetric wheel associated with the reservoir and a powder supply pipe fitted with an air vibrator. EP-A-0 173 654 provides for a control of the powder supply parameters.

However, none of these known solutions is fully satisfactory, and in some particular applications the problems mentioned above are not properly solved by the use of the proposed equipment. Accordingly, it is an object of the invention to provide a device which makes it possible to deliver the powder to a chosen point in relation to the laser energy beam in localized manner and at a low particle speed, thus avoiding the drawbacks referred to above, especially inadequate yield due to powder losses and the risk of blowing disturbances which would be detrimental to the quality of the results.

SUMMARY OF THE INVENTION

According to the invention there is provided a powder supply device for use in the formation of a coating by laser beam treatment, comprising a powder dispensing apparatus for supplying the powder with a carrier gas, a delivery pipe for conducting said carrier gas and powder from said dispensing apparatus, an expansion chamber connected to said delivery pipe to receive said carrier gas and powder therefrom, said expansion chamber having an inlet pipe for conducting said carrier gas and powder into said chamber, a powder diffuser carried by said inlet pipe, a conical part and an outlet pipe connected thereto for the passage of powder from said expansion chamber, and an exhaust pipe for the escape of carrier gas from said expansion chamber disposed in a face of said chamber opposite said outlet pipe, said exhaust pipe being fitted with a flow regulator, and said outlet pipe being fitted with a nozzle for the discharge of powder at the end thereof remote from said expansion chamber.

Preferably, the powder diffuser is vertically adjustable within the expansion chamber and, also, the discharge nozzle may be provided with a protective gas diffuser and/or a water cooling device.

Other features and advantages of the invention will become apparent from the following description of a Preferred embodiment, given by way of example, with reference to the attached drawings.

DESCRIPTION OF THE PREFERRED EMBODIMENT

Figure 1:
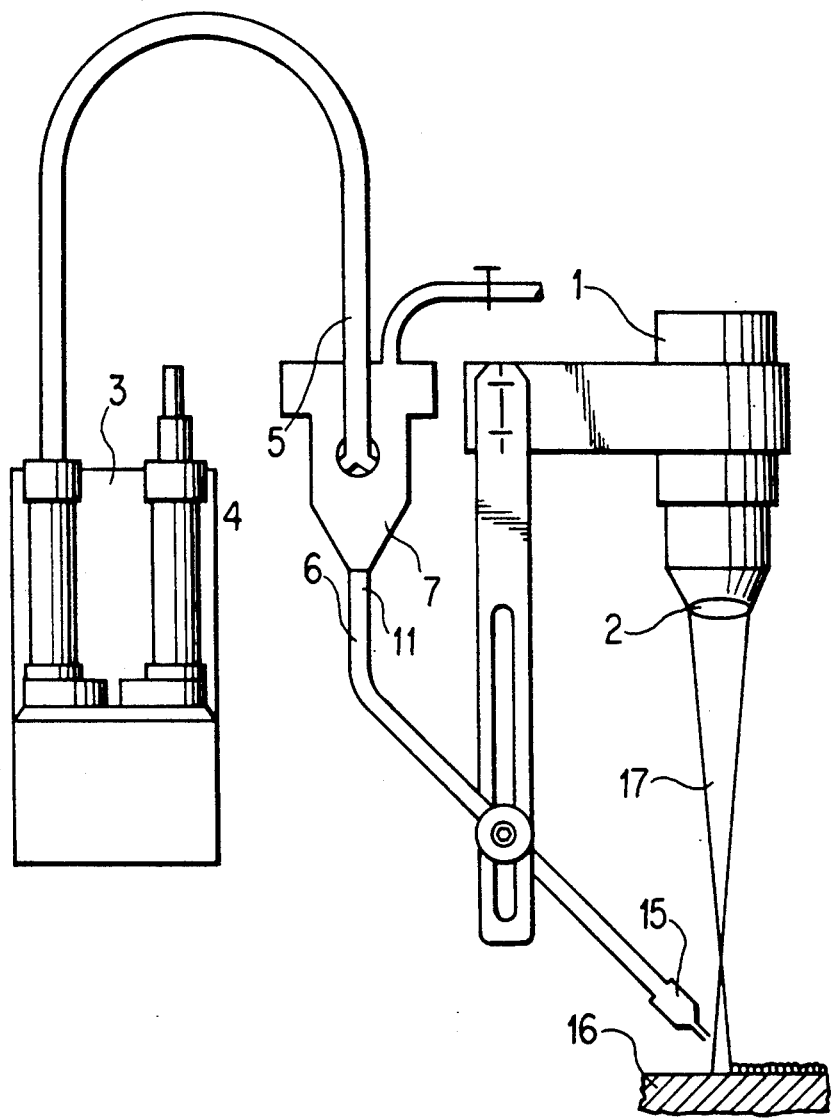
FIG. 1 is a diagrammatic overall view of a laser beam coating installation employing one embodiment of the device in accordance with the invention for supplying the powder to be deposited by the laser beam.

A coating installation involving deposition of powder by means of a laser is diagrammatically represented in FIG. 1 and comprises, as is generally known for various such applications, a generator 1 for an energy beam of laser type, an optical system 2 for focusing the beam, and a powder dispenser 3 of a known type comprising a control device including a flow meter, a store of powder and a connection to a supply of a neutral carrier gas such as, for example, argon. The powder is conducted to a melting zone created by the laser beam by a pipe 4 including some flexible parts 5 and some rigid parts 6.

Figure 2:
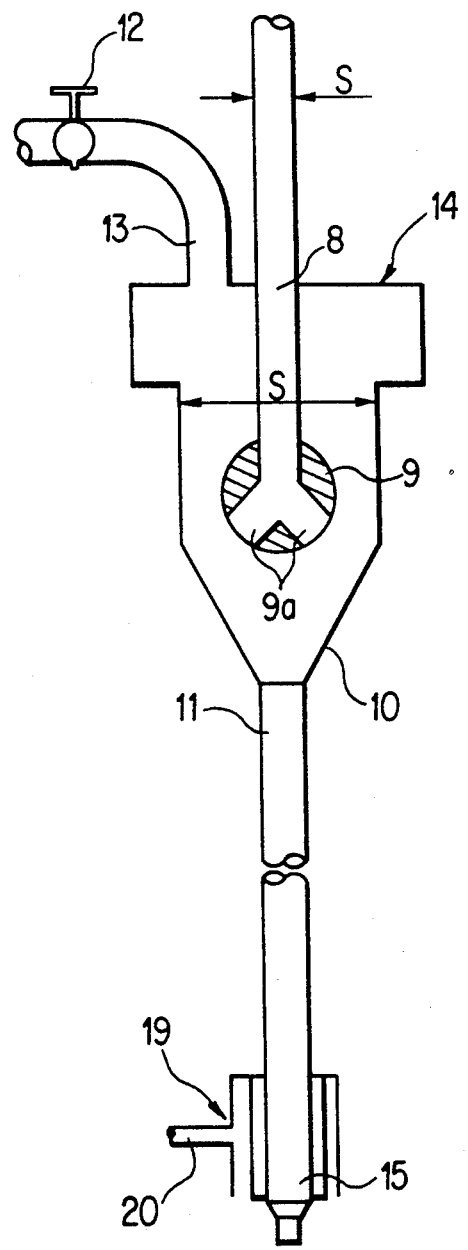
FIG. 2 is a diagrammatic sectional view, to a larger scale, of part of the powder supply device shown in FIG. 1, illustrating in particular the expansion chamber of the device.

In accordance with the invention, and as shown in greater detail in FIG. 2, a chamber 7 is fitted into the powder delivery pipe 4, the chamber 7 having at least one section S which is much larger than the section s of the inlet pipe 8 which enters the chamber 7. The end of the inlet pipe 8 within the chamber 7 carries a powder diffuser 9 having passages 9a for distributing the powder, and the position of the diffuser 9 within the chamber 7 is adjustable, particularly in height. The chamber 7 brings about an expansion or release of the carrier gas while the diffuser 9 ensures an even calibrated flow of powder. The inner surface of the chamber 7 is polished and free from any roughness so as to prevent powder being retained, and the chamber 7 comprises at least one conical part 10 at its lower end leading into an outlet pipe 11 which is connected to the chamber. The flow of powder and carrier gas in the outlet pipe 11 is weaker than the flow in the inlet pipe 8 and is set by the expansion chamber 7 by means of a flow regulation effected by a valve 12 situated in a gas exhaust pipe 13 connected to the chamber 7 at a face 14 thereof opposite the outlet pipe 11. The distal end of the outlet pipe 11 is fitted with a discharge nozzle 15.

The operation of the apparatus will be readily appreciated from the description just given with reference to FIGS. 1 and 2. At the powder dispenser 3 the powder feed is regulated to the amount required for the laser beam treatment to be carried out, and the pressure and flow rate of the carrier gas is controlled to ensure the smooth delivery of the powder and carrier gas to the chamber 7 without any danger of accumulation or blockage.

A proper flow of powder inside chamber 7 itself is then ensured by means of the diffuser 9, which element can be changed depending on the particular application. The rate at which the powder leaves the outlet of the chamber 7 is regulated by means of the exhaust valve 12, so that the powder is supplied at a relatively slow rate through the nozzle 15 to the laser beam treatment zone of a part 16. In this way, the powder is supplied evenly and in a concentrated manner to the focus of operation of the laser beam.

Figures 3A, 3B, 3C:
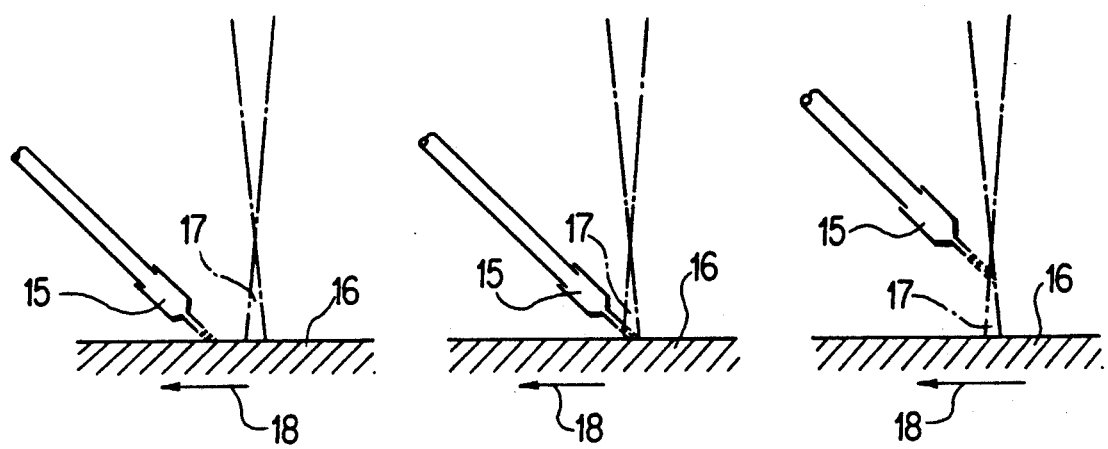
FIG. 3 shows diagrammatically alternative positions A, B, C for the discharge nozzle of the powder supply device relative to the laser beam during a coating operation.

As diagrammatically shown in FIG. 3, depending on the particular applications envisaged, different work patterns are possible. Depending on the position adopted for the discharge nozzle 15 relative to the laser beam indicated by 17, it will thus be possible to obtain, according to alternative A, a pre-deposition of powder upstream of the laser beam or, according to alternative B, an injection of powder into the melt bath created by the irradiation of the part 16 by the laser beam or, further according to alternative C, an injection of powder directly into the beam. With reference to the direction of movement shown by the arrows 18, the nozzle 15 is shown in an upstream position in FIG. 3, but similar arrangements may be adopted in which the nozzle 15 is disposed downstream relative to the laser beam.

The discharge nozzle 15 is also designed to be exchangeable and its outlet diameter, which may be less than 1 mm, is calculated according to the particular application, being adapted to the size of the focal area so as to achieve melting of the maximum amount of powder fed to the beam. In some cases, and especially to lengthen the life of the nozzle 15 by avoiding rapid deterioration caused by excessive heating, it may be advantageous to provide for water cooling of the said nozzle 15.

In some cases also, the discharge nozzle 15 is preferably fitted with an integrated gas diffuser. In this case, the nozzle 15 is surrounded by a double jacket constituting the diffuser 19, the space thus formed being supplied with a protective neutral gas via at least one duct 20.

The additional gas flow ensures protection against oxidation of the deposited material and of the treated area of the part 16. It also clears, by blowing, any excess unmelted powder from the treated area to thus obtain a sound surface, without disturbing the incoming flow of powder during operation.

I claim:

1. A powder supply device for use in the formation of a coating by laser beam treatment, comprising a powder dispensing apparatus for supplying the powder with a carrier gas, a delivery pipe for conducting said carrier gas and powder from said dispensing apparatus, an expansion chamber connected to said delivery pipe to receive said carrier gas and powder therefrom, said expansion chamber having an inlet pipe for conducting said carrier gas and powder into said chamber, a powder diffuser carried by said inlet pipe, a conical part and an outlet pipe connected thereto for the passage of Powder from said expansion chamber, and an exhaust pipe for the escape of carrier gas from said expansion chamber disposed in a face of said chamber opposite said outlet pipe, said exhaust pipe being fitted with a flow regulator, and said outlet pipe being fitted with a nozzle for the discharge of powder at the end thereof remote from said expansion chamber.

2. A powder supply device according to claim 1, wherein the height of said powder diffuser in said expansion chamber is adjustable.

3. A powder supply device according to claim 1, wherein said discharge nozzle is fitted with a gas diffuser formed by a double jacket surrounding said nozzle end connected to a supply of protector gas.

4. A powder supply device according to claim 1, wherein said discharge nozzle is fitted with a water cooling means.

* * * * *

UNITED STATES PATENT AND TRADEMARK OFFICE
CERTIFICATE OF CORRECTION

PATENT NO. : 5,182,430
DATED : January 26, 1993
INVENTOR(S) : Georges L. Lagain

It is certified that error appears in the above-indentified patent and that said Letters Patent is hereby corrected as shown below:

In column 2, line 11, delete "Preferred" and insert

--preferred--;

In column 3, line 22, delete "pre-deposition" and insert

--predeposition--;

In column 4, line 24, delete "Powder" and insert

--powder--;

In column 4, line 37, delete "end" and insert

--and--;

Signed and Sealed this

Fifth Day of April, 1994

Attest:

BRUCE LEHMAN

*Attesting Officer*   *Commissioner of Patents and Trademarks*